United States Patent [19]
Bur, III

[11] 3,796,944
[45] Mar. 12, 1974

[54] MULTI-CONTROLLER APPARATUS WITH CONTROLLER LIMITING

[75] Inventor: Philip W. Bur, III, Horsham, Pa.

[73] Assignee: Honeywell Inc., Minneapolis, Minn.

[22] Filed: May 2, 1973

[21] Appl. No.: 356,344

[52] U.S. Cl. ............... 323/100, 328/69, 330/307, 330/98
[51] Int. Cl. ............................................. G05f 1/00
[58] Field of Search ............. 323/17, 19, 22 T, 100; 330/30 D, 69, 98, 107; 328/69; 318/678; 307/24, 35

[56] References Cited
UNITED STATES PATENTS

| R26,516 | 1/1969 | Newbold | 323/22 T |
|---|---|---|---|
| 3,377,548 | 4/1968 | Newbold | 323/100 |
| 3,628,129 | 12/1971 | Riley | 323/100 |
| 3,639,824 | 2/1972 | Malavasi | 323/19 X |
| 3,686,557 | 8/1972 | Futamura | 318/678 X |
| 3,694,662 | 9/1972 | Grygera et al. | 307/24 |

Primary Examiner—Gerald Goldberg
Attorney, Agent, or Firm—Arthur H. Swanson; Lockwood D. Burton; Robert V. Wilder

[57] ABSTRACT

A process controlling apparatus includes a plurality of controllers wherein a selected controller regulates a single controlled element. The input signal of an amplifier in the unselected controller, is so limited by an associated limiting circuit that the output signal thereof does not deviate more than a predetermined percentage from the output signal of the selected controller which is regulating the controlled element.

9 Claims, 5 Drawing Figures

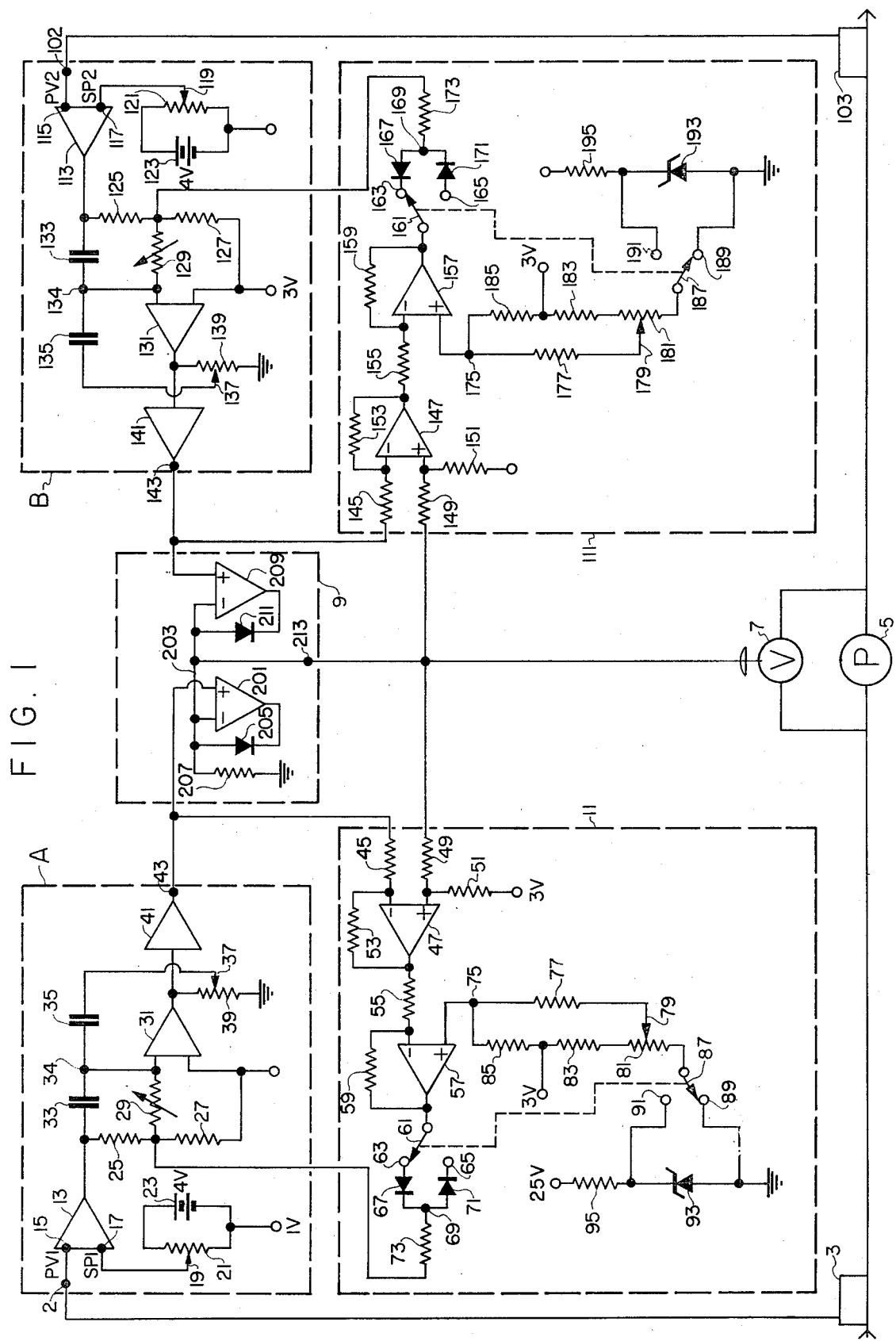
FIG. I

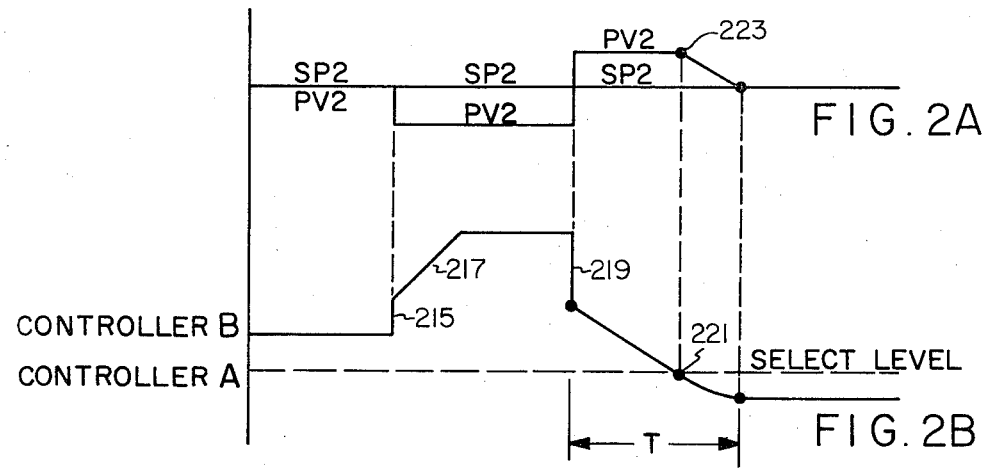
FIG. 2A
FIG. 2B
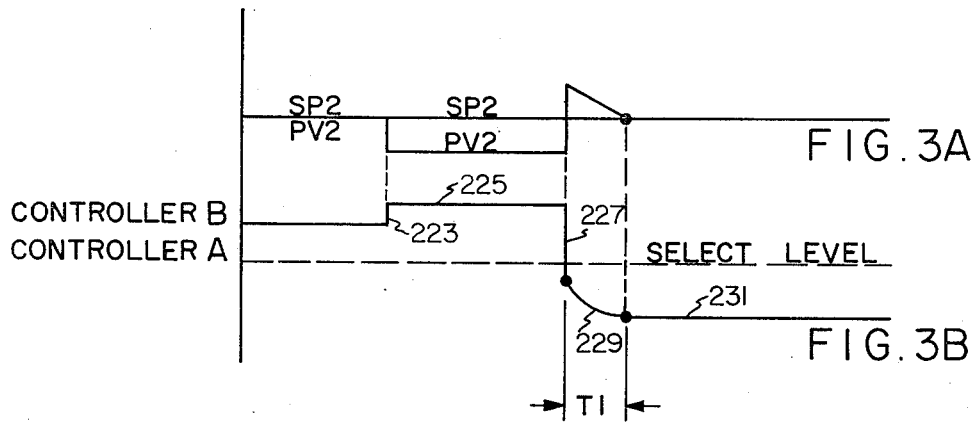
FIG. 3A
FIG. 3B

MULTI-CONTROLLER APPARATUS WITH CONTROLLER LIMITING

BACKGROUND OF THE INVENTION

The present invention relates generally to process controllers, and more specifically, to a unique limiting circuit for use with a process controller arrangement wherein a plurality of process controllers sense a plurality of variables and one selected controller regulates the operation of a controlled element.

In many process control applications, an auctioneering or overriding controller arrangement is required. For example, in a pumping station, a common control arrangement includes controllers on both low pressure and high pressure sides of the pump. At any one time only one of the controllers is regulating the process. That controller may be considered to be the selected controller and the other controller to be the unselected controller. When one variable, for example the low side pressure, is above the low side set point, the controller sensing the low side pressure will take control and govern the operation of the controlled element, for example, a bypass valve shunting the pump. If, while the low side controller is regulating the operation of the valve, the high side pressure should go below its set point for a period of time, the high side or unselected controller, through its integral or "reset" action, may become saturated. Prior art arrangements have provided limiting circuits for limiting the output of the unselected controller to a point just below saturation thereby precluding the deleterious effects of saturation. However, even with such prior art arrangements, an appreciable and undesirable delay in the unselected controller takeover of the operation of the controlled element is experienced. That delay is due to the fixed nature of the limiting level as is hereinafter explained. The existance of that delay limits the responsiveness and efficacy of the multi-variable control arrangement and is illustrative of a major disadvantage of prior art controller systems which include reset action.

SUMMARY OF THE INVENTION

It is accordingly an object of the present invention to provide a controller apparatus which obviates the disadvantages of prior art devices.

It is another object of the present invention to provide a control apparatus which includes a limiting circuit for limiting the output of the unselected controller i.e., the controller not in control, to a predetermined percentage above or below the output signal of the selected controller i.e., the controller which is in control of the operation of the controlled element.

It is a further object of the present invention to provide a controller apparatus as set forth which is simple in design and construction.

In accomplishing these and other objects, there has been provided, in accordance with the present invention, a controller apparatus including at least two process controllers for controlling the operation of a controlled element in response to one of at least two sensed variables. At least one of the controllers includes a controller reset circuit for providing integral or reset action, and a limiting circuit connected between the controller output and the reset circuit of the controller, for limiting the output signal of the controller not in control, from exceeding a predetermined percentage deviation from the output signal of the controller which is in control.

BRIEF DESCRIPTION OF THE DRAWINGS

A better understanding of the present invention may be had from the following detailed description, when read in connection with the accompanying drawings, in which:

FIG. 1 is a schematic diagram of the controller apparatus embodying the present invention;

FIGS. 2A and 2B provide an illustration of the operation of prior art devices; and FIGS. 3A and 3B provide an illustration of the operation of a controller apparatus constructed in accordance with the present invention.

DESCRIPTION OF THE PREFERRED EMBODIMENT

Referring to FIG. 1 in detail, there is shown a first controller A which receives a first process variable signal PV 1 through a first controller input terminal 2 from a first process variable sensor 3. In the present example, the first process variable signal is representative of the pressure on the low pressure side of a pump 5. A second controller B receives a second process variable signal PV 2 through a second controller input terminal 102 from a second process variable sensor 103 which, in the present example, senses the pressure on the high pressure side of the pump 5. Each process controller A and B has a corresponding limiting circuit 11 and 111, respectively, coupled thereto. A controlled element, or utilization device for example a bypass valve 7, is controlled from a selector circuit 9. The selector circuit 9 selects one of the output signals furnished by the first and second controllers and applies that selected output signal to the utilization device or valve 7, and also to the limiting circuits 11 and 111. Therefore, each limiting circuit receives as inputs thereto, the output signal from its associated controller and an electrical signal representative of a monitored condition which, in the present example, is the selected signal from the selector circuit 9.

The first controller A includes an amplifier 13 having two input terminals 15 and 17. The first input terminal 15 receives the first process variable signal PV 1. The second input terminal 17 is connected to a slider 19 which is arranged to be selectively positioned along a slidewire 21. The slidewire 21 is connected across a battery 23, for example of 4 volts. The junction between the negative terminal of the battery 23 and the slidewire 21 is connected to a first source of reference potential of, for example, one volt. Thus, the second input terminal 17 receives a first selectable set-point signal SP 1. The output of the amplifier 13 is connected through two series-connected resistors 25 and 27 to a second source of reference potential, of, for example, 3 volts. The common point between the resistors 25 and 27 is connected through a variable resistor 29 to a first input terminal of an amplifier 31. A second input terminal of the amplifier 31 is also connected to the second reference potential. The output from the amplifier 13 is coupled through a series connected input capacitor 33 to a summing junction 34 which is also connected to the first input terminal of the amplifier 31. A reset capacitor 35 is connected between the summing junction 34 and a slider 37. The slider 37 is arranged to be selectively positioned along a slidewire 39 which is connected between the output of the amplifier 31 and ground. The gain of the operational amplifier arrangement including the amplifier 31 is a function of the ratio of the input impedance and the feedback impedance of the amplifier 31 as well as the resistance ratio established by the position of the slider 37. The slider 37 acts to allow adjustment of the gain of the operational amplifier arrangement and hence an adjustment of the proportional action of the controller. The output terminal of the amplifier 31 is connected to an input terminal of an amplifier 41 which in turn provides a first controller output signal at the first controller output terminal 43. The resistors 25, 27 and 29 along with the reset capacitor 35 are included in a reset action circuit of the controller A for providing controller integral or reset action as is well known in the art. The output terminal 43 of the first controller is connected through a resistor 45 to the negative terminal of a differential amplifier 47 in the first limiting circuit 11. A positive input terminal of the amplifier 47 receives a second input signal through a resistor 49. In the present example that second input signal is the selected signal from the selector circuit 9. However, in non-selector arrangements including only a controller and limiter, the second input signal to the limiter circuit may be any electrical signal representative of a monitored condition which may advantageously be employed to limit the controller output signal. The positive input terminal of the amplifier 47 is also connected through a resistor 51 to a source of reference potential of, for example, 3 volts. A resistor 53 is connected between a negative input terminal of the amplifier 47 and its output terminal. The output terminal of the amplifier 47 is connected through a resistor 55 to a negative input terminal of another amplifier 57. A resistor 59 is connected between the negative input terminal of the amplifier 57 and its output terminal. The output terminal of the amplifier 57 is also connected to a switching member 61, which is, in turn, selectively operable to engage one of two terminals 63 and 65. A diode 67 has its anode connected to the terminal 63 and its cathode connected to a common point 69. Another diode 71 has its cathode connected to the terminal 65 and its anode connected to the common point 69. The common point 69 is also connected through a resistor 73 to the junction between the resistors 25 and 27 of the reset action circuit in the first process controller A. The positive input terminal of the amplifier 57 is connected to a common point 75. The common point 75 is connected through a resistor 77 to a slider 79. The slider 79 is arranged to slide along the slidewire 81. One end of the slidewire 81 is connected through two series connected resistors 83 and 85 to the common point 75. The junction between the resistors 83 and 85 is connected to a reference potential of, for example, 3 volts. The other end of the slidewire 81 is connected to a switching member 87 which is selectively operable to contact one of two terminals 89 and 91. The switching member 87 is ganged to the switching member 61 for simultaneous operation therewith such that when the switching member 87 is engaging the terminal 89, the switching member 61 is contacting the terminal 63. The terminal 89 is connected to the anode of a zener diode 93 which is, in turn, connected to ground. The terminal 91 is connected to the cathode terminal of the zener diode 93. The cathode of the zener diode 93 is also connected through a resistor 95 to a reference potential of, for example, 25 volts.

The second process controller B and the second limiting circuit 111 are identical and component configuration to the first process controller A and the first limiting circuit 11, respectively; the components therein are therefore identified with corresponding numerical designations as their counterpart components of the controller A and limiting circuit 11, except that the identification numerals of the components in the second controller B and second limiting circuit 111 are numbered 113 to 195, respectively.

The output terminal 43 of the first process controller A is connected to a first input terminal of a differential amplifier 201 in the selector circuit 9 which, in the illustrative embodiment, is configural to select the lower of the two input signals. The second input terminal of the amplifier 201 is connected to a bus 203. The output terminal of the amplifier 201 is connected through the cathode to anode path of a diode 205 to the bus 203 which is, in turn, connected through a resistor 207 to ground reference. The selector circuit 9 also includes a second differential amplifier 209. The differential amplifier 209 has a first input terminal thereof connected to the output terminal 143 of the second controller B. The second input terminal of the differential amplifier 209 is connected to the bus 203. The output terminal of the differential amplifier 209 is connected to the bus 203 through the cathode to anode path of a diode 211. The bus 203 provides an output or selected signal from the selector circuit 9 at the selector output terminal 213. The selected signal is then applied to the utilization device or valve 7 and also to the positive input terminals of the amplifier 47 and 147 in the limiting circuits 11 and 111, respectively.

OPERATION OF THE PREFERRED EMBODIMENT

For purposes of explaining the operation of the embodiment shown in FIG. 1, it will be assumed that the output signal from the first controller A is lower in magnitude than the output signal from the second controller B, and therefore the output signal of the first controller A is "selected" by the low selector circuit 9 and applied to control the utilization device or valve 7. If the process controller arrangement shown in FIG. 1 had no limiting implementation, and the process variable applied to the second controller B were to remain at a magnitude less than the magnitude of the corresponding set point SP2, the second controller B would eventually go into saturation thereby providing unsatisfactory operation. Even if the second controller B were provided with the limiting circuit for limiting the output of the controller B to a magnitude just below saturation, the efficiency of the controller may still be improved, as is done in the present invention. For example, a deficiency in prior art controller arrangements is illustrated by reference to FIGS. 2A and 2B. Assuming that the process variable signals PV2 applied to the second controller B is equal to the set point signal SP2 of the process controller B, and that the relative outputs from the controllers are shown in FIG. 2B with the output signal from controller A relatively lower than the output signal from controller B, the output signal from the controller A would be applied to the valve 7 to control the process. If, at a later time the second process variable signal PV2 should decrease with respect to the selected set point signal SP2, that sudden decrease in the second process variable signal PV2 will be coupled through the capacitors 133 and 135 and will effect a sudden increase in the output signal of the second controller B as shown by the line segment 215 in FIG. 2B. Thereafter if the second process variable signal PV2 remains the same with respect to the corresponding set point signal SP2, the output signal from the second controller B will gradually increase as shown by the line segment 217 as a result of the reset action of the second controller B. If the second controller B had conventional saturation limiting circuitry, the output from the controller B would then continue to increase until it reached a point just below the saturation level of the controller B. At that point controller B output would be limited, and the output from controller B would remain substantially the same until the second process variable signal PV2 again changed magnitude with respect to the second set point signal SP2. If at a later time the second process variable signal PV2 exhibited a step increase to a magnitude which was positive with respect to the second set point signal SP2, that step increase would again be coupled through the capacitor 133 and appear in the output signal of the controller B as a step decrease shown by the line segment 219 in FIG. 2B. If that decrease in the output signal of the controller B were not sufficient to cause the output signal of the controller B to be selected by the selector circuit 9, i.e., if that decrease did not cause the output of controller B to assume a magnitude less than the output of controller A, controller A would still be in control of the process and the output signal of controller B would gradually decrease at the reset rate of the controller B until it reached the "select level" or the level of the output signal of controller A. That point is indicated at 221 in FIG. 2B. When the output signal from controller B becomes negative with respect to the output signal from controller A, the output signal from controller B becomes selected by the low selecting circuit 9 and begins to control the process. When controller B begins to control the process, the process variable signal PV2 applied to controller B will begin to approach the magnitude of the second set point signal SP2 as shown at 223 of FIG. 2A. The output signal from controller B will then begin to level off and when the second process variable signal PV2 is equal to the second set point signal SP2 the output signal from controller B will level off and remain substantially unchanged until another relative variance occurs between the second process variable signal PV2 and the second set point signal SP2. It is therefore apparent, that with a controller arrangement having only conventional saturation limiting, a substantial time delay T occurs between the time the second process variable signal PV2 went positive with respect to the second set point signal SP2 and the time that the second controller B takes over control of the process and effects a balancing of the second process variable signal PV2 with the second set point signal SP2. The present invention overcomes that undesirably long time delay as is hereinafter explained.

FIGS. 3A and 3B illustrate an advantage derived from the present invention under a like set of relative changes between the second process variable signal PV2 and the second set point signal SP2 as occurred with the hypothetical controller arrangement explained in connection with FIGS. 2A and 2B above. In FIG. 3A, the second process variable signal PV2 and the second set point signal SP2 are initially substantially equal and the output signal from controller A is relatively lower in magnitude than the output signal from controller B and has been selected by the low selector. That being the case, the voltage on the bus 203 will be substantially equal to the voltage of the output signal from controller A. Under those conditions, the diode 211 will be back biased, blocking the output from the amplifier 209 while the diode 205 will be forwardly biased, allowing the controller A to maintain control of the utilization device 7 through the amplifier 201.

Accordingly, the signal applied to the negative terminal of the amplifier 147 in the second limiting circuit 111 is more positive than the selected signal applied to the positive terminal of the amplifier 147. The difference between those signals is applied to the amplifier 157 in the limiting circuit 111. A threshold signal is applied to the positive terminal of the amplifier 157. The threshold signal may be varied by selectively varying the position of the slider 179 on the slidewire 181. Such variation effectively changes the relative difference required, between the output signal from the controller B and the selected output signal, to precipitate a change in the output signal from the amplifier 157. In the present example, the effective range of deviation between the selected signal applied to the valve 7 and either output signal from the controller A and B is 4 volts i.e., each signal ordinarily varies from 1 to 5 volts. A 5 percent deviation in the present example would be equivalent to a 0.2 volt difference between the input signals applied to the amplifier 147. Therefore, the circuitry including the resistors 177, 181, 183 and 185 along with the switching member 187, the resistor 195, and the zener diode 193, are so selected to provide a threshold signal to the positive terminal of the amplifier 157 that when the difference signal applied to the negative terminal of the amplifier 157 exceeds 0.2 volts, the output from the amplifier 157 will switch over to a "high" level. The positioning of the slider 179 on the slidewire 181 in the present example is operable to vary the percentage deviation of the second controller output signal from the selected signal, required to switch the output state of the amplifier 157, from 5 to 20 percent of the selected signal. Referring again to FIG. 3B, the step change in the controller B output signal 223 is assumed to be in excess of the selected percent deviation determined by the setting of the slidewire 179. For example it will be assumed that the slider 179 is positioned to provide a threshold voltage to the amplifier 157 which causes the amplifier 157 to go high whenever a 5 percent or greater deviation occurs between the controller B output signal and the selected signal. Referring again to FIG. 3B, when the second set point signal S2 and the second process variable signal PV2 are equal, and the output signals from the controllers A and B are in a steady state condition, and the output from controller B does not exceed the "select level" by more than 5 percent of the select level, the output from the amplifier 147 in the limiting circuit 111 will not exceed the threshold signal applied to the positive terminal of the amplifier 157. The output signal from the amplifier 157 will then be in a low state and, since the switching member 161 is set for high limiting, i.e., contacting the terminal 163, the diode 167 is back biased, thereby effectively open circuiting the connection between the second controller B and the second limiting circuit 111. However, when the second process variable signal PV2 exhibits a relative step decrease with respect to the second set point signal SP2, that step decrease appears at the output of the differential amplifier 113 in the controller B and is coupled through the capacitors 133 and 135 to the output of the controller B. It will be assumed that that decrease is sufficiently large to ordinarily effect a deviation between the controller B output and the controller A output of more than 5 percent of the controller A output. However, when the 5 percent level is exceeded, the amplifier 157 in the limiting circuit 111 goes high and forward biases the diode 167. When the diode 167 is forward biased a circuit is completed between the limiting circuit 111 and the input of the controller B. The connection provided through the diode 167 of the limiting circuit 111 to the reset action circuit of the controller B is such that when the 5 percent deviation occurs, current from the limiter 111 is added to the input of the controller B in a sense opposite that from the input signal from the amplifier 113 to reduce the net input signal to the controller to a tolerable level. That is, it simulates a change in PV2 as if the process follow-up had actually reduced the difference between PV2 and SP2. Therefore, the controller B output signal will increase in response to the step decrease of the second process variable signal PV2, but the controller B output signal will only increase to a level which is 5 percent above the select level of the magnitude of the signal applied to the valve 7. That increase is shown by the line segment 223 in FIG. 3B. At that point, the controller B output signal will remain substantially at the same level i.e., 5 percent above the select level, as shown by the line segment 225, as the diode 167 becomes conductive thereby substantially inhibiting the reset action circuit of the controller B. If at a later time, the process variable signal PV2 exhibits a step increase to a magnitude more positive than that of the second set point signal SP2, that step increase is coupled through the capacitor 133 and appears as a step decrease 227 in the output signal of the controller B. That step decrease in the controller B output signal causes the output signal from the amplifier 157 in the limiting circuit 111 to go low and back-bias the diode 167 thereby effectively open circuiting the connection between the limiting circuit 111 and the controller B. At that time, the limiting circuit 111 is ineffective to further inhibit the reset action of the controller B. At the same time, the step decrease in the controller B output signal causes the controller B output signal to become negative with respect to the select level of controller A output signal. The output signal from the controller B is then selected by the selector circuit 9 and the controller B then becomes operative to control the valve 7. With the controller B in control of the process, the second process variable signal PV2 will immediately begin to decrease toward the second set point signal SP2 and the controller B output signal will accordingly begin to level off (229). When the second process variable signal PV2 is substantially equal to the second set point signal SP2, the output signal from the controller B levels off and remains substantially unchanged as shown by the line segment 231 until another material change occurs in the process.

Since the output of the unselected or reset tracking controller in the present example, is limited to a level no more than 5 percent above the level of the output signal of the selected controller, changes in the process variable signal applied to the reset tracking or unselected controller are more rapidly acted upon than in prior art devices. In the present example, it should be noted that the decrease in controller B output signal effected a substantial equalizing of the second process variable signal PV2 and the second set point signal SP2 in a much shorter period of time T1 than the time T in which a similar equalizing took place in a prior art device having only saturation limiting. Therefore, the present invention provides a much more efficient controller arrangement with much closer control of the process.

Before the step decrease in the controller B output signal, the selected signal applied to the positive terminal of the amplifier 47 in the limiting circuit 11 was substantially the same as the controller A output signal applied to the negative terminal of the amplifier 47. Thus, the difference signal applied to the amplifier 57 of the limiter 11 was less than the threshold magnitude applied to the positive terminal of the amplifier 57 and the output signal of the amplifier 57 effectively backbiased the diode 67 thereby open circuiting the connection between the first controller A and the first limiting circuit 11. However, after the step decrease in the controller B output signal, if the controller A output signal should tend to increase to a magnitude greater than 5 percent of the magnitude of the selected signal, the first limiting circuit 11 would act in the same manner that the second limiting circuit 111 acted with respect to the second controller B as hereinbefore explained. That is, the deviation signal applied to the negative terminal of the amplifier 57 in the limiting circuit 11 would exceed the threshold signal applied to the positive terminal of the amplifier 57 and the diode 67 would be forward biased to apply current from the reset circuitry of the first controller A in opposition to the input signal and thereby inhibit further reset action.

The first and second limiting circuits 11 and 111 are shown with the switching members 61 and 161 in the high limiting position. However, if a process control arrangement were required such that a high selector circuit were required instead of the low selector circuit 9, the switching member 61 and 161 would be switched to their other positions and provide a low limiting effect on the controllers A and B, respectively. The switches 87 and 187 which are ganged to the switching members 61 and 161, respectively, are effective to change the threshold level in accordance with the selection of either high or low limiting. The controller and the controlled element may be direct or reverse acting and the selector circuit may be a high or a low selector without departing from the spirit of the present invention. However, with a low selector circuit, a high limiter should be used and vice versa.

The simple three wire connections from each limiter 11 and 111 to the associated controllers A and B, respectively, comprise an added feature of the present invention, i.e., its simplicity and ease of connection to a controller system.

Thus, there has been provided, in accordance with the present invention, a multi controller apparatus for controlling a single operation selectively from a plurality of process variables, and including a unique and simple limiting circuit effective to limit the output signal from an unselected or tracking controller to within a predetermined percentage of the output signal magnitude from a selected controller which is regulating the operation of a controlled element.

The embodiments of the present invention in which an exclusive property or privilege is claimed, are defined as follows:

1. A process controlling apparatus comprising:
    a first process controller including a reset action circuit, said first process controller having input means for receiving a first input signal representative of a process variable, and an output means for providing a first controller output signal;
    a second process controller including a reset action circuit, said second process controller having input means for receiving a second input signal representative of a second process variable, and an output means for providing a second controller output signal;
    a selector circuit having first and second input terminals connected to said output means of said first and second controllers, respectively, and an output terminal to provide a selected signal, representative of one of said first and second controller output signals, for application to a utilization device;
    a first limiting circuit having first and second input terminal means connected to said first controller output means and said selector circuit output terminal, respectively, said first limiting circuit including an output terminal connected to said reset action circuit of said first controller, said first limiting circuit further including means for comparing said first controller output signal with said selected signal and providing a first reset inhibiting signal at said output terminal of said first limiting circuit whenever said first controller output signal deviates from said selected signal in a predetermined direction by a predetermined percentage of said selected signal;
    a second limiting circuit having first and second input terminal means connected to said second controller output means and said selector circuit output terminal, respectively, said second limiting circuit including an output terminal connected to said reset action circuit of said second controller, said second limiting circuit further including means for comparing said second controller output signal with said selected signal and providing a second reset inhibiting signal at said output terminal of said second limiting circuit whenever said second controller output signal deviates from said selected signal in a predetermined direction by a predetermined percentage of said selected signal;
    said first and second reset inhibiting signals being effective to inhibit further reset action in said first and second controllers, respectively.

2. The process controlling apparatus as set forth in claim 1 wherein said first limiting circuit further includes means for selectively varying said predetermined percentage of said selected signal.

3. The process controlling apparatus as set forth in claim 1 wherein said first limiting circuit includes high limiting means for providing said first reset inhibiting signal whenever said first controller output signal deviates in a relatively positive direction from said selected signal by said predetermined percentage of said selected signal.

4. The process controlling apparatus as set forth in claim 1 wherein said first limiting circuits includes low limiting means for providing said first reset inhibiting signal whenever said first controller output signal deviates in a relatively negative direction from said selected signal by said predetermined percentage of said selected signal.

5. The process controlling apparatus as set forth in claim 1 wherein said first limiting circuit further includes:
    high limiting means for providing said first reset inhibiting signal whenever said first controller output signal deviates in a relatively positive direction from said selected signal by said predetermined percentage of said selected signal;
    low limiting means for providing said first reset inhibiting signal whenever said first controller output signal deviates in a relatively negative direction from said selected signal by said predetermined percentage of said selected signal; and
    switching means selectively operable to connect one of said high limiting means and said low limiting means to said first limiting circuit to become operative therein.

6. The process controlling apparatus as set forth in claim 1 wherein said first and second limiting circuits each include:
    first amplifier means having input terminals for receiving said selected signal and said first controller output signal, and an output terminal for providing a difference signal representative of the difference between said selected signal and said first controller output signal;
    threshold signal generating means operative to provide a threshold signal;
    second amplifier means having input terminals connected to said first amplifier means and said threshold signal generating means, said second amplifier means further having an output terminal for providing an output signal, whenever said difference signal deviates in a predetermined direction from said threshold signal by a predetermined amount;
    means responsive to said second amplifier output signal for providing said first reset inhibiting signal.

7. The process controlling apparatus as set forth in claim 6 wherein said first limiting circuit further includes means for selectively varying the magnitude of said threshold signal.

8. The process controlling apparatus as set forth in claim 7 wherein said first limiting circuit further includes means for effectively changing said predetermined direction in which said difference signal must deviate from said threshold signal by said predetermined amount in order to provide said second amplifier output signal.

9. A combination comprising:
    a process controller including a reset action circuit, said process controller having input means for receiving an input signal representative of a process variable, and an output means for providing a controller output signal for application to a utilization device; and
    a limiting circuit having first and second input terminal means, said first input terminal means of said limiting circuit being connected to said output means of said process controller, said second input terminal means of said limiting circuit being arranged to receive an electrical signal representative of a monitored condition, said limiting circuit also including an output terminal connected to said reset action circuit of said process controller;

said limiting circuit further including means for comparing said controller output signal with said electrical signal, and providing a reset inhibiting signal at said output terminal of said limiting circuit whenever said controller output signal deviates from said electrical signal in a predetermined direction by a predetermined percentage of said electrical signal, said reset inhibiting signal being effective to inhibit further reset action in said process controller.

* * * * *

UNITED STATES PATENT OFFICE
CERTIFICATE OF CORRECTION

Patent No. 3,796,944  Dated March 12, 1974

Inventor(s) Philip W. Bur, III

It is certified that error appears in the above-identified patent and that said Letters Patent are hereby corrected as shown below:

In Fig. 1, the polarity of the diodes 167 and 171 should be reversed.

Signed and sealed this 24th day of September 1974.

(SEAL)
Attest:

McCOY M. GIBSON JR.
Attesting Officer

C. MARSHALL DANN
Commissioner of Patents